United States Patent [19]

Ouhayoun et al.

[11] Patent Number: 4,551,843
[45] Date of Patent: Nov. 5, 1985

[54] GAS WAVE-GUIDE LASER GENERATOR

[75] Inventors: Michel Ouhayoun, Paris; Alain Robert, Vitry, both of France

[73] Assignee: Societe Anonyme de Telecommunications, Paris, France

[21] Appl. No.: 511,460

[22] Filed: Jul. 7, 1983

[30] Foreign Application Priority Data

Jul. 9, 1982 [FR] France ............................... 82 12147

[51] Int. Cl.⁴ ............................................. H01S 3/097
[52] U.S. Cl. .......................................... 372/87; 372/64
[58] Field of Search ................ 372/64, 87, 55; 378/99

[56] References Cited

U.S. PATENT DOCUMENTS 4,381,564  4/1983  Newman ............................... 372/87

FOREIGN PATENT DOCUMENTS 2071904A  3/1981  United Kingdom .

OTHER PUBLICATIONS

Hall et al., "A Compact Sealed Waveguide O₂ Laser"; J. Phys D. Appl. Phys. vol. 10, 1977.
Klein et al., "10.6 μm Waveguide Laser Power Amplifier" IEEE JQE 11 (8), Aug. '75.

Primary Examiner—William L. Sikes
Assistant Examiner—Léon Scott
Attorney, Agent, or Firm—Bacon & Thomas

[57] ABSTRACT

The generator comprises an envelope and two mirrors defining a resonant cavity, in which is maintained a monolithic wave-guide with a capillary. The capillary is formed in a thinned portion of the guide. Two electrodes extend over the thinned portion of the guide. The capillary is circular in cross section, this being obtained by drilling or extrusion of a cylindrical bar made of dielectric material. The circulation of the laser gas is excellent and the laser plasma uniform. The generator has multiple applications, for example in the medical field.

6 Claims, 4 Drawing Figures

GAS WAVE-GUIDE LASER GENERATOR

BACKGROUND OF THE INVENTION

The present invention relates to a gas wave-guide laser generator, comprising a resonant cavity with a wave-guide capillary, filled with a laser gas, and high-frequency electrical excitation or pumping means for provoking a discharge in the gas of the capillary.

Applications of such a generator are multiple and may for example be both medical and military.

Wave-guide capillary lasers already offer the advantage of a volumetric yield much greater than that of conventional lasers.

As to the high-frequency excitation process, for example in a frequency range of between 30 MHz and 3 GHz, preferably at 100 MHz, and which consists in creating an alternating electric field to induce a discharge in the gas, it also presents certain advantages per se.

The excitation voltage is low, for example 100 V, and precautions of insulation are no longer necessary.

The source of supply, or pumping, may be miniaturized.

The life duration is considerably increased due to the absence of anode and cathode for obtaining the discharge and therefore of drop in cathodic potential where the laser gas is dissociated.

The resonance cavity also serves as wave-guide for the energy generated.

It should be noted here that transverse excitation, i.e. the creation of an alternating electric field perpendicular to the longitudinal axis of the capillary is preferred to longitudinal excitation.

A wave-guide laser generator is already known, formed by two metal bars, or blocks, separated by two other dielectric bars, or blocks, or vice versa, the four of them forming, after assembly, a chamber or guide of rectangular cross section, the two metal bars serving as electrodes.

An insulating film may advantageously be applied on the inner wall of each of the metal bars to avoid oxidation thereof by the laser gas, the excitation field traversing this film.

A wave-guide laser generator is also known, of rectangular cross section, formed by a U-section closed by a cover plate, the section and the cover plate being made of alumina, and the electrodes, of thin metal layers, being applied on the walls of the cover plate and the section.

Although these two types of wave-guide lasers offer the advantages set forth hereinbelow, they nevertheless present certain drawbacks.

They are essentially limited to a wave-guide of square cross section.

Due to this geometry, there are several possible transverse modes translated by different aspects of the energetic distribution in the cross section of the laser beam, i.e. by spots.

In addition, the very structure of these lasers, whether they are of sandwich type or of cover plate type, leads to so-called assembled systems with four or two blocks, which present the drawbacks of the assembly.

From the optical standpoint, they generate deformations and therefore also optical losses.

From the industrial production point of view, they require an adjustment, soldering or gluing which can never be perfect.

Further, British Patent application No. 2 071 904 discloses a gas wave-guide laser generator incorporating a capillary, comprising a monolithic bar made of dielectric material, in which is formed a through capillary, a resonant cavity comprising the capillary, filled with the laser gas, and high-frequency electrical pumping means for provoking a laser discharge in the gas of the capillary.

Due to the monolithic character of the wave-guide, all the drawbacks associated with known gas tubes made by assembly are eliminated.

However, this latter generator comprises electrodes immersed in the capillary, so that they are oxidized by the laser gas which decomposes, this reducing the life duration of the laser. This phenomenon is also provoked by the electron bombardment (sputtering) of these electrodes, during the discharge.

It is an object of the present invention to eliminate these latter drawbacks.

SUMMARY OF THE INVENTION

To this end, the present invention relates to a gas wave-guide laser generator incorporating a capillary, comprising a monolithic bar made of dielectric material, in which is formed a through capillary, a resonant cavity comprising the capillary, filled with the laser gas, and high-frequency electrical pumping means for provoking a laser discharge in the gas of the capillary, characterized in that the bar comprises a thinned intermediate portion flush with the capillary, and electrodes extending over the thinned portion of the bar virtually over the whole of its length and on either side of the capillary.

In a preferred embodiment of the generator of the invention, the pumping means excite the laser gas at radio frequency.

In this case, the impedance of the plasma is positive and consequently the plasma is uniform.

BRIEF DESCRIPTION OF THE DRAWINGS

The invention will be more readily understood on reading the following description with reference to the accompanying drawings, in which.

DETAILED DESCRIPTION OF A PREFERRED EMBODIMENT OF THE INVENTION

Figure 1:
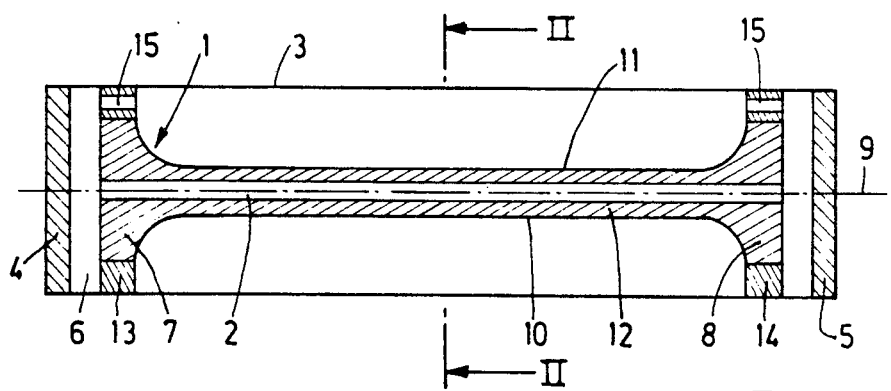
FIG. 1 is a view in axial section of the generator of the invention.
Figure 2:
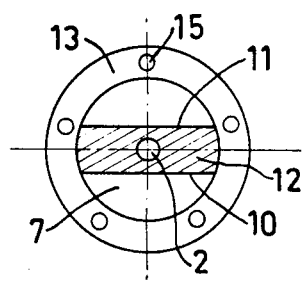
FIG. 2 is a view in section of the wave-guide along line II—II of FIG. 1.
Figure 3:
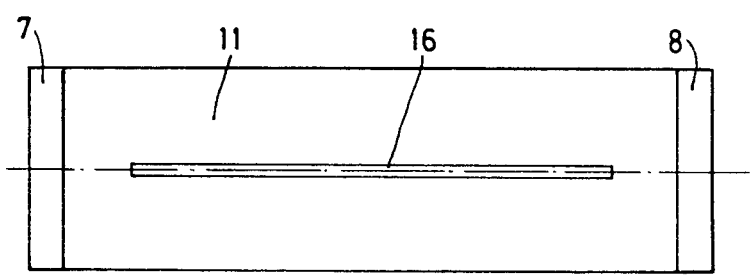
FIG. 3 is a plan view of one side of the wave-guide of the generator of FIG. 1.
Figure 4:
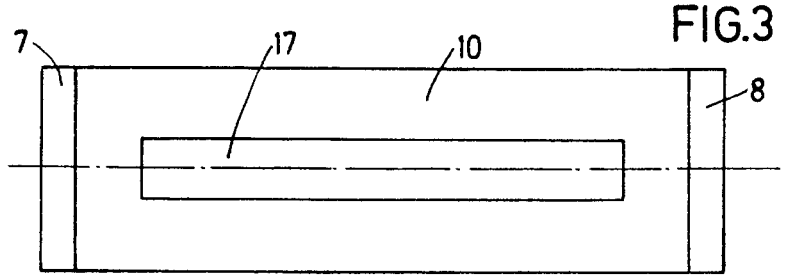
FIG. 4 is a plan view of the other side of the wave-guide of the generator of FIG. 1.

Referring now to the drawings, the gas wave-guide laser generator shown therein comprises a monolithic bar 1, made of dielectric material, for example BeO, $Al_2O_3$, or any other like material comprising a through capillary duct 2, and an outer envelope 3, closed at its two ends by two mirrors 4 and 5 and forming a resonant cavity 6, inside of which the bar 1 is disposed and containing an active gas.

The outer form of the monolithic bar 1 is generally cylindrical, of axis 9. It comprises two cylindrical end portions 7 and 8 and a thinned intermediate portion 12 defined by two parallel planes 10 and 11 equidistant from the axis 9 of the bar and joined to the two end portions 7 and 8. By way of indication only, it should be noted that a bar has been produced, 230 mm in length, with an overall diameter of 20 mm, with a thickness, in its median part, of about 3.5 mm, and provided with end portions 7, 8 with an axial length of 3 mm.

In the embodiment shown, the capillary 2 has a circular section of axis 9. Capillaries of 2 and 2.5 mm diameter have been made. Capillary 2 extends from one end of the bar 1 to the other to open out, at its two ends, into cavity 6.

The bar 1 is maintained in the envelope 3 by two annular rings 13 and 14 in abutment against the inner wall of the envelope 3 and in which are respectively disposed the end portions 7 and 8 of the bar 1, thus serving to maintain and center the bar.

The rings 13, 14 are pierced with orifices 15 for the circulation of the laser gas from outside the bar to inside, and vice versa.

FIG. 1 shows two plane mirrors, but the invention does not exclude the use of other mirrors, for example spherical ones. One of the two mirrors is a semi-transparent plate for the outlet of the laser beam.

The gaseous medium used, at a pressure of the order of 80 to 100 Torr, is constituted, in the example in question, by a mixture of carbon dioxide gas, nitrogen and helium, which, by excitation, produces an emission in the infrared, of about 10.6 $\mu$m wave-length.

However, the invention does not exclude other gaseous media, such as for example a mixture containing carbon monoxide, of which excitation produces an emission, still in the infrared, of about 5 $\mu$m wavelength.

The wave-guide laser generator in question uses electrical pumping and therefore comprises a source of supply (not shown) and two electrodes disposed to provoke an electric discharge in the gas capillary.

The laser is pumped at high frequency, and more particularly at radio frequency (RF), of which pumping the advantages have been set forth hereinabove.

The procedure preferably consists in transverse excitation, by creation of a high-value transverse alternating electric field, i.e. perpendicular to axis 9. It should be emphasized that procedure may also consist in longitudinal RF excitation, along axis 9, but that, in that case, a certain transverse excitation would also be induced.

The electrodes, respectively connected to the two terminals of the source of A.C. supply, are disposed on the two flat faces 10 and 11 of the intermediate portion 12 of the bar 1.

The first electrode 16 is thread-like, extends substantially over the whole length of portion 12 and is for example taken to the excitation potential at radio frequency. As to the other reference electrode 17, therefore taken to earth, it also extends over virtually the whole length of portion 12, but over a much greater width, enabling it to perform a role of radiator.

The invention as described up to the present offers considerable advantages, apart from those of known gas wave-guide lasers with excitation at radio frequency.

The gas tube has a monolithic structure and eliminates all the drawbacks of conventional tubes of assembled structure.

The central narrow part of the bar in which the wave-guide capillary is formed increases the volume of the enclosure containing the laser gas and in which it may circulate. Renewal of the gas inside the capillary is therefore more satisfactory.

The electrodes which are in addition very simple, efficiently cover the region of the capillary to be excited and enable a uniform laser plasma to be obtained.

The wave-guide is of circular cross section, which is an optimal solution from the optical point of view, to generate a laser emission in a mode with gaussian energetic distribution centered on axis 9.

This form of capillary may in fact be obtained with the aid, in particular, of the process of manufacture which will now be described.

A cylindrical bar is taken, having the same diameter as the centering portions 7, 8 described above. In fact, it is not possible to form a capillary in a bar of too fine a structure.

An axial through bore is firstly formed in the bar to make the capillary 2, by piercing with a drill. It will be noted here that the cost of producing such a capillary is particularly low. Of course, the capillary need not be axial.

The bar is then machined to thin it down in its central part along two planes 10 and 11, until virtually flush with the capillary 2, and to reserve at the two ends two cylindrical portions 7, 8 for maintaining and centering. An embodiment has been produced in which the thickness of the wall of the bar 1, in its intermediate portion 12, virtually did not exceed 0.6 mm. Of course, the bar might also be thinned down along surfaces other than plane surfaces.

It then remains to deposit, in known manner, the two electrodes 16 and 17 on the planes 10 and 11 of the machined region.

It will be noted that a cylindrical bar has been considered, for simplicity's sake. However, a bar of different shape could have been taken.

A process of manufacture by extrusion may also be carried out, with a tool whose shape is complementary of the capillary, which further presents the advantage of being able to make capillaries of any cross section, for example circular, square or rectangular, whilst with a process by assembly, cylindrical capillaries are virtually impossible to obtain.

With a capillary of rectangular section, the so-called multi-passage technology can advantageously be carried out, making it possible, with the aid of additional, non-transparent mirrors, disposed between the waveguide and the end mirrors of the resonant cavity, to obtain in the width several paths of the laser beam within the wave-guide. For example, two additional mirrors disposed respectively near the two ends of the guide allow three passages.

What is claimed is:

1. A wave guide laser generator comprising a monolithic bar made of dielectric material and including a thinned portion extending over an intermediate portion of the bar; a resonant cavity defined by an envelope means and comprising a capillary extending throughout the bar, said capillary filled with an active laser gas; said thinned portion extending closely adjacent and coextensive with a central portion of said capillary on opposite sides thereof; and a high frequency electrical pumping means for provoking a laser discharge in said active gas and generating a population inversion therein, said pumping means comprising two electrodes disposed contiguous with and extending over virtually the whole of the length of said thinned portion on opposite sides of said capillary, one of said two electrodes being threadlike in form, the other strip-like in form.

2. The generator of claim 1, wherein the laser gas contains carbon dioxide gas.

3. The generator of claim 1, wherein said pumping means is arranged to excite the laser gas at radio frequency.

4. The generator of claim 1, wherein the capillary is of circular cross section.

5. A wave guide laser generator as claimed in claim 1, said bar having enlarged end portions arranged to support and center the bar within said cavity.

6. A wave guide laser generator as claimed in claim 5, including annular ring means enclosing said enlarged end portions of said bar within said cavity, said ring means including apertures extending generally axially of the bar for permitting free circulation of active gas within the cavity.

* * * * *